(12) United States Patent
Nakano et al.

(10) Patent No.: US 11,065,564 B2
(45) Date of Patent: Jul. 20, 2021

(54) PRESSURE CONTROL DEVICE

(71) Applicant: NIDEC TOSOK CORPORATION, Kanagawa (JP)

(72) Inventors: Takeshi Nakano, Kanagawa (JP); Yoshinori Yamaki, Kanagawa (JP); Tomohiro Yasuda, Kanagawa (JP); Weiming Chen, Kanagawa (JP); Kenta Kuramochi, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 43 days.

(21) Appl. No.: 16/538,805

(22) Filed: Aug. 12, 2019

(65) Prior Publication Data

US 2020/0070068 A1 Mar. 5, 2020

(30) Foreign Application Priority Data

Aug. 28, 2018 (JP) .............................. JP2018-158897

(51) Int. Cl.
*B01D 29/05* (2006.01)
*B01D 35/30* (2006.01)
*F16K 11/07* (2006.01)
*F16K 37/00* (2006.01)

(52) U.S. Cl.
CPC ............. *B01D 29/05* (2013.01); *B01D 35/30* (2013.01); *B01D 2201/20* (2013.01); *B01D 2201/30* (2013.01); *B01D 2201/4053* (2013.01); *F16K 11/07* (2013.01); *F16K 37/0033* (2013.01)

(58) Field of Classification Search
CPC ................... B01D 29/05; B01D 35/30; B01D 2201/4053; B01D 2201/30; B01D 2201/20; B01D 29/03; B01D 35/00; B01D 2201/29; B01D 35/157; B01D 35/14; F16K 11/07; F16K 37/0033; F16K 37/0041
USPC ........ 210/435, 439, 446, 455, 171, 432, 447
See application file for complete search history.

(56) References Cited

U.S. PATENT DOCUMENTS 2,798,613 A * 7/1957 Tinker ................... B01D 35/02
210/446

FOREIGN PATENT DOCUMENTS

JP 2014234829 12/2014

* cited by examiner

*Primary Examiner* — Madeline Gonzalez
(74) *Attorney, Agent, or Firm* — JCIPRNET

(57) ABSTRACT

A pressure control device reliably preventing foreign matter from flowing beyond a filter unit to the downstream side. The pressure control device includes a body and a cylindrical filter unit. The body has a flow path including a groove and a widened part. A depth of the groove from an upper surface to a bottom is a first depth. The widened part is connected to the groove, extends from the upper surface to the bottom, and has a width larger than a width of the groove. The filter unit is housed along a depth direction of the widened part to capture foreign matter mixed in a fluid passing through the flow path. A depth of the widened part from the upper surface to a bottom surface is a second depth larger than the first depth. The widened part includes a receiving part that a part of the filter unit enters.

7 Claims, 11 Drawing Sheets

PRESSURE CONTROL DEVICE

CROSS-REFERENCE TO RELATED APPLICATION

This application claims the priority benefit of Japan Application No. 2018-158897, filed on Aug. 28, 2018. The entirety of the above-mentioned patent application is hereby incorporated by reference herein and made a part of this specification.

BACKGROUND

Technical Field

The disclosure relates to a pressure control device.

Description of Related Art

The oil pressure control device mounted on an automobile for the clutch, for example, is known as an oil pressure control device for controlling oil pressure (see Patent Document 1, for example). The oil pressure control device described in Patent Document 1 includes a body having a flow path through which hydraulic oil passes, and a cylindrical filter provided in the middle of the flow path to capture foreign matter such as powder mixed in the hydraulic oil.

Moreover, generally for the oil pressure control devices, when the filter is inserted into the flow path of the body and these members are assembled together to manufacture an oil pressure control device, the assembly work is usually performed manually, for example.

However, the oil pressure control device described in Patent Document 1 has a tendency that it becomes harder to insert the filter into the flow path as the flow path becomes narrower, that is, the width of the flow path becomes smaller. Therefore, the filter may not be correctly inserted into the flow path. In such a case, there is a problem that the foreign matter may not be sufficiently captured by the filter and may directly flow beyond the filter to the downstream side.

RELATED ART

Patent Document

[Patent Document 1] Japanese Laid-Open No. 2014-234829

SUMMARY

According to an embodiment of the disclosure, a pressure control device includes: a body having a flow path that includes a groove and a widened part, wherein a depth of the groove from a surface to a first bottom is a first depth, and the widened part is connected to the groove, extends from the surface to the first bottom, and has a width larger than a width of the groove; and a cylindrical filter unit housed along a depth direction of the widened part to capture foreign matter mixed in a fluid that passes through the flow path, wherein a depth of the widened part from the surface to a second bottom is a second depth larger than the first depth, and the widened part includes a receiving part that a part of the filter unit enters.

BRIEF DESCRIPTION OF THE DRAWINGS

FIG. 11 is a longitudinal cross-sectional view showing a state of use of the filter unit shown in

FIG. 9.

DESCRIPTION OF THE EMBODIMENTS

The disclosure provides a pressure control device that can reliably prevent foreign matter from flowing beyond the filter unit to the downstream side.

According to an embodiment of the disclosure, it is possible to reliably prevent foreign matter from flowing beyond the filter unit to the downstream side.

Hereinafter, a pressure control device of the disclosure will be described in detail based on the exemplary embodiments shown in the attached drawings.

In each drawing, the Z axis direction is set as the vertical direction Z. The X axis direction is set as the left-right direction X, which is among the horizontal directions orthogonal to the vertical direction Z. The Y axis direction is set as the axial direction Y orthogonal to the left-right direction X, which is among the horizontal directions orthogonal to the vertical direction Z. The positive side of the vertical direction Z is called the "upper side" and the negative side is called the "lower side". The positive side of the axial direction Y is called the "front side" and the negative side is called the "rear side". The front side corresponds to one side in the axial direction and the rear side corresponds to the other side in the axial direction. In addition, the upper side, lower side, front side, rear side, vertical direction, and left-right direction are simply names for describing the relative positional relationship between the parts, and the actual arrangement relationship, etc. may be one other than the arrangement relationship, etc. indicated by these names. Also, the "plan view" refers to a state of viewing the lower side from the upper side.

First Embodiment

Hereinafter, the first embodiment of the pressure control device of the disclosure will be described with reference to FIG. 1 to FIG. 8.

Figure 1:
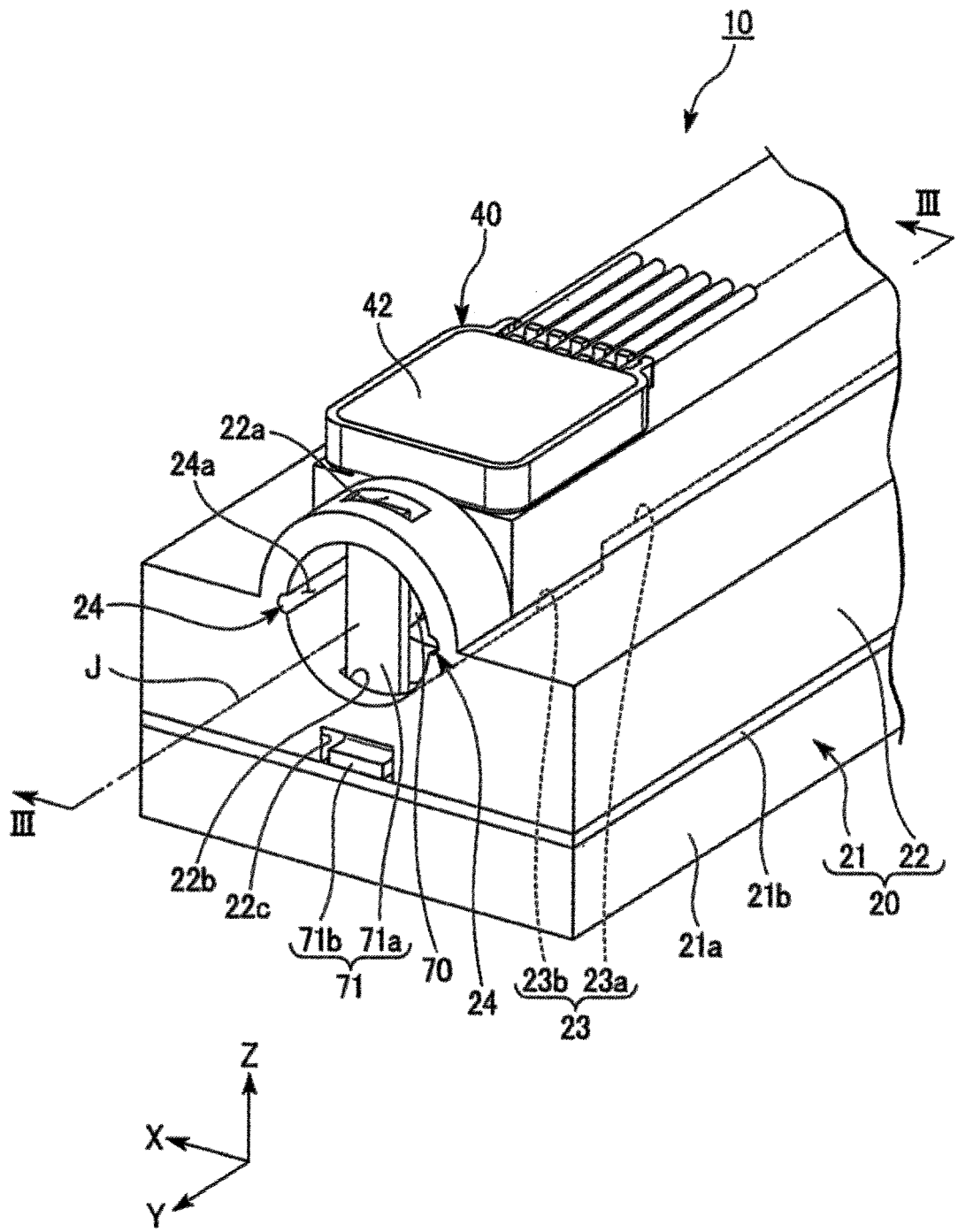
FIG. 1 is a perspective view showing the pressure control device (first embodiment) of the disclosure.
Figure 2:
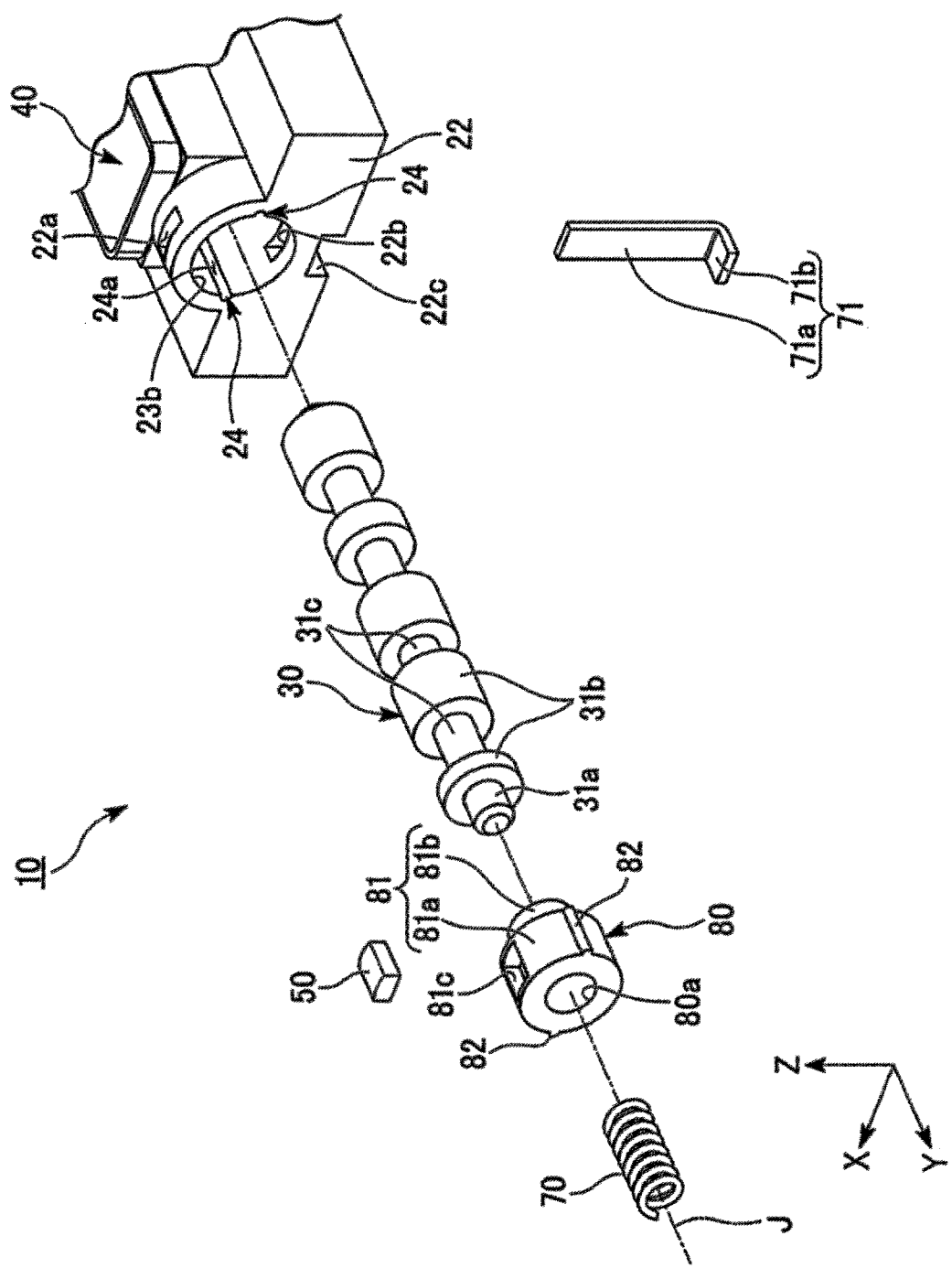
FIG. 2 is an exploded perspective view of the pressure control device shown in FIG. 1.

The pressure control device 10 of the present embodiment shown in FIG. 1 and FIG. 2 is, for example, a control valve mounted on a vehicle. The pressure control device 10 includes an oil passage body 20, a spool valve 30, a magnet holder 80, a magnet 50, an elastic member 70, a fixing member 71, and a sensor module 40.

Figure 3:
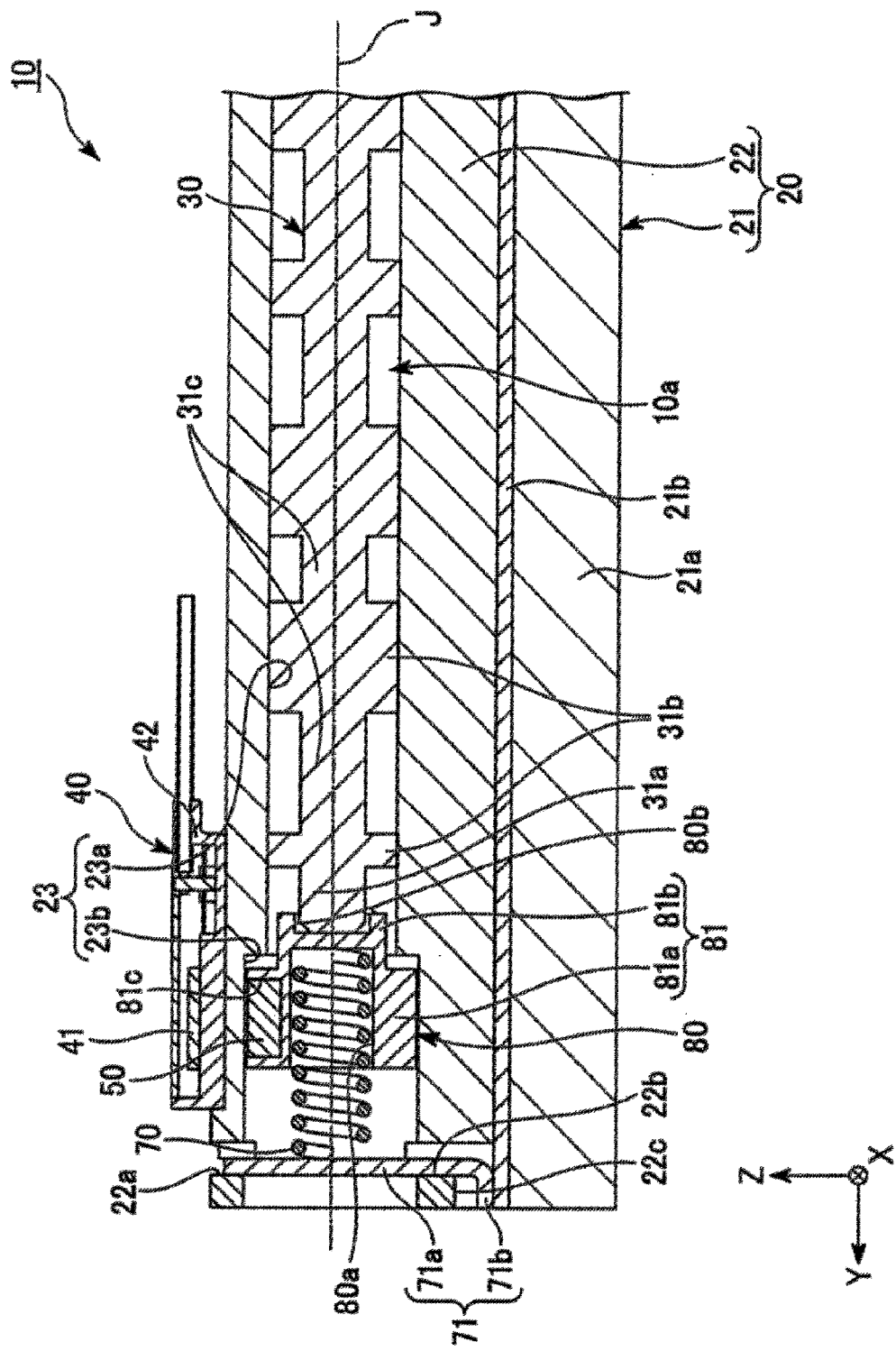
FIG. 3 is a cross-sectional view taken along the line III-III in FIG. 1.

As shown in FIG. 3, the oil passage body 20 has an oil passage 10a, through which oil flows, inside. The portion of the oil passage 10a indicated in FIG. 3 is a part of a spool hole 23 which will be described later. Each drawing shows a state where a part of the oil passage body 20 is cut out, for example. As shown in FIG. 1, the oil passage body 20 includes a lower body 21 and an upper body 22. Although not shown, the oil passage 10a is provided in both the lower body 21 and the upper body 22, for example.

The lower body 21 includes a lower body main body 21a and a separate plate 21b disposed to overlap on the upper side of the lower body main body 21a. In the present embodiment, the upper surface of the lower body 21 corresponds to the upper surface of the separate plate 21b and is orthogonal to the vertical direction Z. The upper body 22 is disposed to overlap on the upper side of the lower body 21. The lower surface of the upper body 22 is orthogonal to the vertical direction Z. The lower surface of the upper body 22 is in contact with the upper surface of the lower body 21, that is, the upper surface of the separate plate 21b.

As shown in FIG. 3, the upper body 22 has the spool hole 23 that extends in the axial direction Y. In the present embodiment, the cross-sectional shape of the spool hole 23 orthogonal to the axial direction Y is a circular shape centered on a central axis J. The central axis J extends in the axial direction Y. A radial direction centered on the central axis J is simply referred to as the "radial direction" and a circumferential direction centered on the central axis J is simply referred to as the "circumferential direction".

The spool hole 23 opens at least on the front side. In the present embodiment, the rear end of the spool hole 23 is blocked. That is, the spool hole 23 is a hole that opens on the front side and has a bottom. Nevertheless, the spool hole 23 may open on both sides in the axial direction Y, for example. At least a part of the spool hole 23 constitutes a part of the oil passage 10a in the oil passage body 20.

The spool hole 23 includes a spool hole main body 23a and an introduction hole 23b. Although not shown, the oil passage 10a provided in a portion other than the spool hole 23 in the oil passage body 20 opens on the inner circumferential surface of the spool hole main body 23a. The inner diameter of the introduction hole 23b is larger than the inner diameter of the spool hole main body 23a. The introduction hole 23b is connected to the front end of the spool hole main body 23a. The introduction hole 23b is the front end of the spool hole 23 and opens on the front side.

Figure 4:
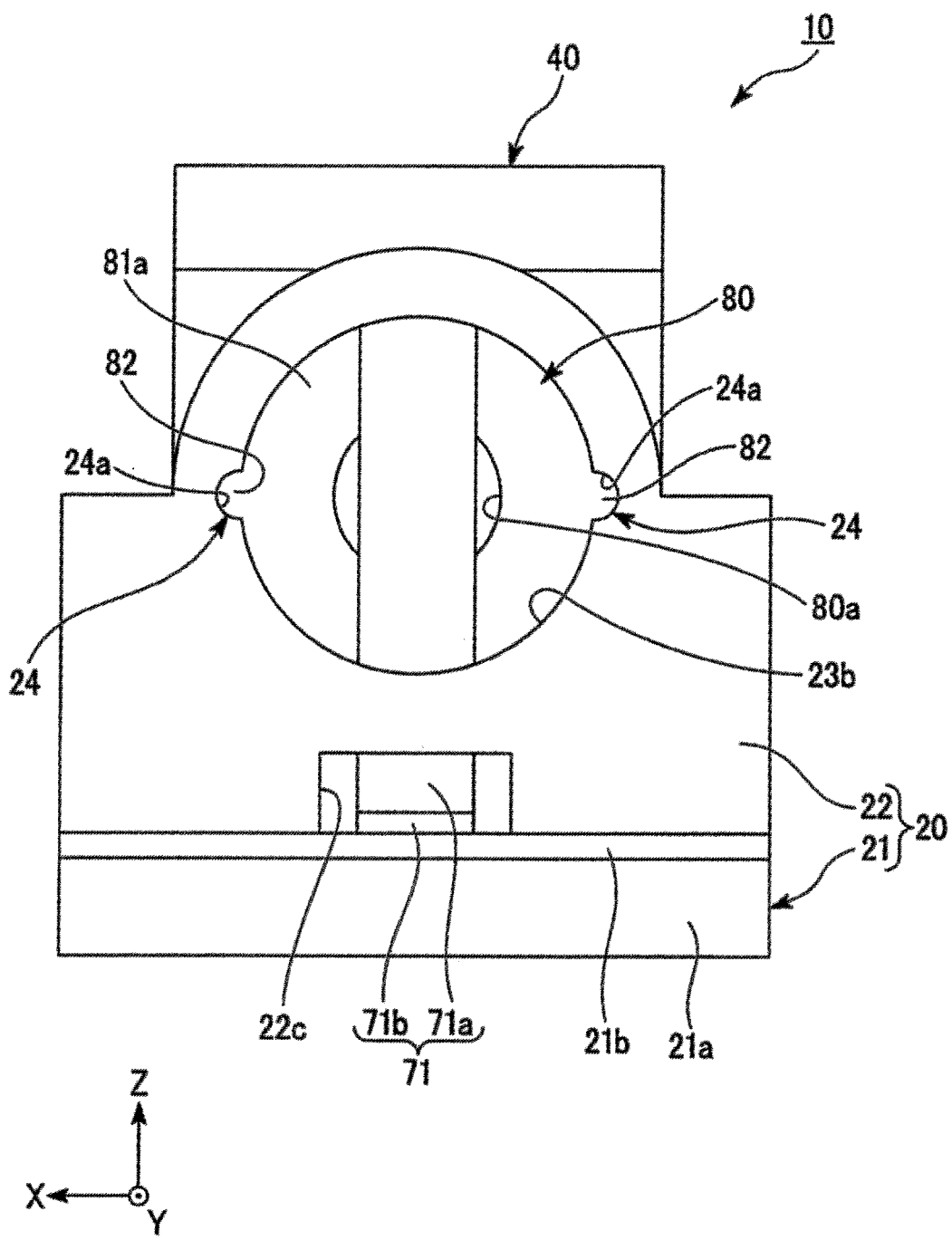
FIG. 4 is a view when the pressure control device shown in FIG. 1 is viewed from the front side.

As shown in FIG. 1, the spool hole 23 has a groove 24 that is recessed from the inner circumferential surface of the spool hole 23 toward the outer side in the radial direction and extends in the axial direction Y. In the present embodiment, a pair of grooves 24 are provided on both sides of the central axis J. A pair of grooves 24 are recessed from the inner circumferential surface of the introduction hole 23b on both sides in the left-right direction X. The groove 24 is provided from the front end of the inner circumferential surface of the introduction hole 23b to the rear end of the inner circumferential surface of the introduction hole 23b. As shown in FIG. 4, an inner surface 24a of the groove 24 has a semicircular arc shape that is concaved from the inner circumferential surface of the introduction hole 23b toward the outer side in the radial direction as viewed from the front side.

As shown in FIG. 3, the upper body 22 has through holes 22a, 22b, and 22c at the front end of the upper body 22. The through hole 22a penetrates a portion of the upper body 22 from the upper surface of the upper body 22 to the inner circumferential surface of the introduction hole 23b in the vertical direction Z. The through hole 22b penetrates a portion of the upper body 22 from the lower surface of the upper body 22 to the inner circumferential surface of the introduction hole 23b in the vertical direction Z. As shown in FIG. 1, the through hole 22a and the through hole 22b each have a rectangular shape elongated in the left-right direction X as viewed from the upper side. The through hole 22a and the through hole 22b overlap each other as viewed from the upper side.

As shown in FIG. 3, the through hole 22c penetrates a portion of the upper body 22 from the front surface of the upper body 22 to the through hole 22b in the axial direction Y. The through hole 22c is provided at the lower end of the front surface of the upper body 22. The through hole 22c opens on the lower side. As shown in FIG. 4, the through hole 22c has a rectangular shape elongated in the left-right direction X as viewed from the front side. The centers of the through holes 22a, 22b, and 22c in the left-right direction X are the same as the position of the central axis J in the left-right direction X, for example.

As shown in FIG. 1, a portion of the upper body 22 where the spool hole 23 is provided protrudes toward the upper side with respect to the other portions of the upper body 22. The upper surface at the front end of the protruding portion is a semicircular arc-shaped curved surface that is convex on the upper side. The through hole 22a opens at the upper end of the semicircular arc-shaped curved surface. The lower body main body 21a, the separate plate 21b, and the upper body 22 are single members respectively, for example. The lower body main body 21a, the separate plate 21b, and the upper body 22 are made of a non-magnetic material.

As shown in FIG. 3, the spool valve 30 is disposed along the central axis J extending in the axial direction Y that intersects the vertical direction Z. The spool valve 30 has a columnar shape. The spool valve 30 is attached to the oil passage body 20. The spool valve 30 is disposed to be movable in the axial direction Y in the spool hole 23.

The spool valve 30 moves in the axial direction Y in the spool hole main body 23a to open and close the opening of the oil passage 10a that opens on the inner circumferential surface of the spool hole main body 23a. Although not shown, a force directed forward is applied from a drive device such as oil pressure or a solenoid actuator to the rear end of the spool valve 30. The spool valve 30 includes a support part 31a, a plurality of large-diameter parts 31b, and a plurality of small-diameter parts 31c. Each part of the spool valve 30 has a columnar shape that is centered on the central axis J and extends in the axial direction Y.

The support part 31a is the front end of the spool valve 30. The front end of the support part 31a supports the rear end of the magnet holder 80. The rear end of the support part 31a is connected to the front end of the large-diameter part 31b.

The large-diameter parts 31b and the small-diameter parts 31c are arranged alternately and continuously from the large-diameter part 31b connected to the rear end of the support part 31a toward the rear side. The outer diameter of the large-diameter part 31b is larger than the outer diameter of the small-diameter part 31c. In the present embodiment, the outer diameter of the support part 31a and the outer diameter of the small-diameter part 31c are the same, for example. The outer diameter of the large-diameter part 31b is substantially the same as the inner diameter of the spool hole main body 23a and slightly smaller than the inner diameter of the spool hole main body 23a. The large-diameter part 31b can move in the axial direction Y while sliding with respect to the inner circumferential surface of the spool hole main body 23a. The large-diameter part 31b functions as a valve for opening and closing the opening of the oil passage 10a that opens on the inner circumferential surface of the spool hole main body 23a. In the present embodiment, the spool valve 30 is a single member made of metal, for example.

The magnet holder 80 is disposed on the front side of the spool valve 30. The magnet holder 80 is disposed to be movable in the axial direction Y inside the introduction hole 23b. The spool valve 30 and the magnet holder 80 are allowed to rotate relative to each other around the central axis. As shown in FIG. 2, the magnet holder 80 includes a holder main body part 81 and opposite parts 82.

The holder main body part 81 has a stepped columnar shape that is centered on the central axis J and extends in the axial direction Y. As shown in FIG. 3, the holder main body part 81 is disposed in the spool hole 23. More specifically, the holder main body part 81 is disposed in the introduction hole 23b. The holder main body part 81 includes a sliding part 81a and a supported part 81b. That is, the magnet holder 80 includes the sliding part 81a and the supported part 81b.

The outer diameter of the sliding part 81a is larger than the outer diameter of the large-diameter part 31b. The outer diameter of the sliding part 81a is substantially the same as the inner diameter of the introduction hole 23b and slightly smaller than the inner diameter of the introduction hole 23b. The sliding part 81a can move in the axial direction Y while sliding with respect to the inner circumferential surface of the spool hole 23, that is, the inner circumferential surface of the introduction hole 23b in the present embodiment. The outer edge in the radial direction on the rear surface of the sliding part 81a can come into contact with a step surface, which faces the front side, of a step formed between the spool hole main body 23a and the introduction hole 23b. Thereby, the magnet holder 80 can be suppressed from moving from the position where the magnet holder 80 and the step surface come into contact with each other toward the rear side, and the terminal end position of the magnet holder 80 can be determined. As will be described later, since the spool valve 30 receives a force directed rearward from the elastic member 70 via the magnet holder 80, by determining the terminal end position of the magnet holder 80, the terminal end position of the spool valve 30 can be determined.

The supported part 81b is connected to the rear end of the sliding part 81a. The outer diameter of the supported part 81b is smaller than the outer diameter of the sliding part 81a and the outer diameter of the large-diameter part 31b and larger than the outer diameter of the support part 31a and the outer diameter of the small-diameter part 31c. The supported part 81b can move into the spool hole main body 23a. The supported part 81b moves in the axial direction Y between the introduction hole 23b and the spool hole main body 23a along with the movement of the spool valve 30 in the axial direction Y.

The supported part 81b has a supported recess 80b that is recessed from the rear end of the supported part 81b toward the front side. The support part 31a is inserted into the supported recess 80b. The front end of the support part 31a is in contact with the bottom surface of the supported recess 80b. Thereby, the magnet holder 80 is supported by the spool valve 30 from the rear side. The dimension of the supported part 81b in the axial direction Y is smaller than the dimension of the sliding part 81a in the axial direction Y, for example.

As shown in FIG. 2, the opposite part 82 protrudes from the holder main body part 81 toward the outer side in the radial direction. More specifically, the opposite part 82 protrudes from the sliding part 81a toward the outer side in the radial direction. In the present embodiment, a pair of opposite parts 82 are provided on both sides of the central axis J. A pair of opposite parts 82 protrude from the outer circumferential surface of the sliding part 81a on both sides in the left-right direction X. The opposite part 82 extends in the axial direction Y from the front end of the sliding part 81a to the rear end of the sliding part 81a. As shown in FIG. 4, the opposite part 82 has a semicircular arc shape that is convex toward the outer side in the radial direction as viewed from the front side.

The pair of opposite parts 82 fit into the pair of grooves 24. The opposite part 82 faces the inner surface 24a of the groove 24 in the circumferential direction and can come into contact with the inner surface 24a. In the present specification, "two portions face each other in the circumferential direction" includes that the two portions are both positioned on one virtual circle along the circumferential direction and face each other.

As shown in FIG. 3, the magnet holder 80 has a first recess 81c that is recessed from the outer circumferential surface of the sliding part 81a toward the inner side in the radial direction. In FIG. 3, the first recess 81c is recessed from the upper end of the sliding part 81a toward the lower side. The inner surface of the first recess 81c includes a pair of surfaces that face each other in the axial direction Y.

The magnet holder 80 has a second recess 80a that is recessed from the front end of the magnet holder 80 toward the rear side. The second recess 80a extends from the sliding part 81a to the supported part 81b. As shown in FIG. 2, the second recess 80a has a circular shape that is centered on the central axis J as viewed from the front side. As shown in FIG. 3, the inner diameter of the second recess 80a is larger than the inner diameter of the supported recess 80b.

For example, the magnet holder 80 may be made of resin or metal. When the magnet holder 80 is made of resin, the magnet holder 80 can be easily manufactured. The manufacturing cost of the magnet holder 80 can also be reduced. When the magnet holder 80 is made of metal, the dimensional accuracy of the magnet holder 80 can be improved.

As shown in FIG. 2, the magnet 50 has a substantially rectangular parallelepiped shape. The upper surface of the magnet 50 is a surface curved in an arc shape along the circumferential direction, for example. As shown in FIG. 3, the magnet 50 is housed in the first recess 81c and fixed to the holder main body part 81. Thereby, the magnet 50 is fixed to the magnet holder 80. The magnet 50 is fixed by an adhesive, for example. The outer surface of the magnet 50 in the radial direction is positioned on the inner side in the radial direction with respect to the outer circumferential surface of the sliding part 81a, for example. The outer surface of the magnet 50 in the radial direction faces the inner circumferential surface of the introduction hole 23b via a gap in the radial direction.

As described above, the sliding part 81a provided with the first recess 81c moves while sliding with respect to the inner circumferential surface of the spool hole 23. Therefore, the outer circumferential surface of the sliding part 81a and the inner circumferential surface of the spool hole 23 come into contact with each other or face each other via a slight gap. Thereby, foreign matter such as metal pieces contained in the oil is less likely to enter the first recess 81*c*. Therefore, it is possible to suppress foreign matter such as metal pieces contained in the oil from attaching to the magnet 50 housed in the first recess 81*c*. When the magnet holder 80 is made of metal, since the dimensional accuracy of the sliding part 81*a* can be improved, foreign matter such as metal pieces contained in the oil is less likely to enter the first recess 81*c*.

As shown in FIG. 2, the fixing member 71 has a plate shape with a plate surface parallel to the left-right direction X. The fixing member 71 includes an extended part 71*a* and a bent part 71*b*. The extended part 71*a* extends in the vertical direction Z. The extended part 71*a* has a rectangular shape elongated in the vertical direction Z as viewed from the front side. As shown in FIG. 1 and FIG. 3, the extended part 71*a* is inserted into the introduction hole 23*b* via the through hole 22*b*. The upper end of the extended part 71*a* is inserted into the through hole 22*a*. The extended part 71*a* blocks a part of the opening on the front side of the introduction hole 23*b*. The bent part 71*b* is bent from the lower end of the extended part 71*a* toward the front side. The bent part 71*b* is inserted into the through hole 22*c*. The fixing member 71 is disposed on the front side of the elastic member 70.

In the present embodiment, the fixing member 71 is inserted to the through hole 22*a* via the through hole 22*b* and the introduction hole 23*b* from the opening of the through hole 22*b*, which opens on the lower surface of the upper body 22, before the upper body 22 and the lower body 21 are put to overlap each other. Then, as shown in FIG. 1, the upper body 22 and the lower body 21 are stacked and combined in the vertical direction Z, so that the bent part 71*b* inserted into the through hole 22*c* is supported by the upper surface of the lower body 21 from the lower side. Thereby, the fixing member 71 can be attached to the oil passage body 20.

As shown in FIG. 3, the elastic member 70 is a coil spring that extends in the axial direction Y. The elastic member 70 is disposed on the front side of the magnet holder 80. In the present embodiment, at least a part of the elastic member 70 is disposed in the second recess 80*a*. Therefore, at least a part of the elastic member 70 can overlap the magnet holder 80 in the radial direction, and the dimension of the pressure control device 10 in the axial direction Y can be easily reduced. In the present embodiment, the rear portion of the elastic member 70 is disposed in the second recess 80*a*.

The rear end of the elastic member 70 is in contact with the bottom surface of the second recess 80*a*. The front end of the elastic member 70 is in contact with the fixing member 71. Thereby, the front end of the elastic member 70 is supported by the fixing member 71. The fixing member 71 receives an elastic force directed forward from the elastic member 70, and the extended part 71*a* is pressed against the inner surfaces of the through holes 22*a* and 22*b* on the front side.

The front end of the elastic member 70 is supported by the fixing member 71, so that the elastic member 70 applies an elastic force directed rearward to the spool valve 30 via the magnet holder 80. Therefore, the position of the spool valve 30 in the axial direction Y can be maintained at a position where the force applied from the drive device such as oil pressure or a solenoid actuator to the rear end of the spool valve 30 balances the elastic force of the elastic member 70, for example. Thus, by changing the force applied to the rear end of the spool valve 30, the position of the spool valve 30 in the axial direction Y can be changed to switch between opening and closing of the oil passage 10*a* inside the oil passage body 20.

In addition, the magnet holder 80 and the spool valve 30 can be pressed against each other in the axial direction Y by the force applied from the drive device such as oil pressure or a solenoid actuator to the rear end of the spool valve 30 and the elastic force of the elastic member 70. Therefore, the magnet holder 80 is allowed to rotate around the central axis with respect to the spool valve 30 and moves in the axial direction Y along with the movement of the spool valve 30 in the axial direction Y.

The sensor module 40 includes a case 42 and a magnetic sensor 41. The case 42 houses the magnetic sensor 41. As shown in FIG. 1, the case 42 has a rectangular parallelepiped box shape that is flat in the vertical direction Z, for example. The case 42 is fixed to a flat surface, which is positioned on the rear side of the semicircular arc-shaped curved surface where the through hole 22*a* is provided, on the upper surface of the upper body 22.

As shown in FIG. 3, the magnetic sensor 41 is fixed to the bottom surface of the case 42 inside the case 42. Thereby, the magnetic sensor 41 is attached to the oil passage body 20 via the case 42. The magnetic sensor 41 detects the magnetic field of the magnet 50. The magnetic sensor 41 is a Hall element, for example. Nevertheless, the magnetic sensor 41 may be a magnetic resistance element.

When the position of the magnet 50 in the axial direction Y changes with the movement of the spool valve 30 in the axial direction Y, the magnetic field of the magnet 50 passing through the magnetic sensor 41 changes. Therefore, by detecting the change of the magnetic field of the magnet 50 with the magnetic sensor 41, the position of the magnet 50 in the axial direction Y, that is, the position of the magnet holder 80 in the axial direction Y, can be detected. As described above, the magnet holder 80 moves in the axial direction Y along with the movement of the spool valve 30 in the axial direction Y. Therefore, by detecting the position of the magnet holder 80 in the axial direction Y, the position of the spool valve 30 in the axial direction Y can be detected.

The magnetic sensor 41 and the magnet 50 overlap each other in the vertical direction Z. That is, at least a part of the magnet 50 overlaps the magnetic sensor 41 in a direction parallel to the vertical direction Z among the radial direction. Therefore, it is easy to detect the magnetic field of the magnet 50 with the magnetic sensor 41. Thus, the displacement of the magnet holder 80 in the axial direction Y, that is, the displacement of the spool valve 30 in the axial direction Y, can be detected by the sensor module 40 more accurately.

In the present specification, "at least a part of the magnet overlaps the magnetic sensor in the radial direction" means that at least a part of the magnet overlaps the magnetic sensor in the radial direction at at least a part of the positions within a range where the spool valve with the magnet directly fixed thereto moves in the axial direction. That is, for example, when the spool valve 30 and the magnet holder 80 are displaced from the positions of FIG. 3 in the axial direction Y, the magnet 50 may not overlap the magnetic sensor 41 in the vertical direction Z. In the present embodiment, a part of the magnet 50 overlaps the magnetic sensor 41 in the vertical direction Z at any position if it is within the range where the spool valve 30 moves in the axial direction Y.

The pressure control device 10 further includes a rotation stopper. The rotation stopper is a portion that can come into contact with the magnet holder 80. In the present embodiment, the rotation stopper is the inner surface 24*a* of the groove 24. That is, the opposite part 82 faces the inner surface 24a, which is the rotation stopper, in the circumferential direction and can come into contact with the inner surface 24a.

Therefore, according to the present embodiment, for example, when the opposite part 82 is to rotate around the central axis J, the opposite part 82 comes into contact with the inner surface 24a that is the rotation stopper. Thereby, the rotation of the opposite part 82 is suppressed by the inner surface 24a, and the magnet holder 80 is suppressed from rotating around the central axis J. Thus, it is possible to suppress the position of the magnet 50 fixed to the magnet holder 80 from shifting in the circumferential direction. Therefore, when the position of the spool valve 30 in the axial direction Y remains unchanged, even if the spool valve 30 rotates around the central axis J, the positional information of the magnet 50 in the axial direction Y detected by the magnetic sensor 41 can be suppressed from changing. Thereby, it is possible to suppress the positional information of the spool valve 30 from changing and improve the accuracy of grasping the position of the spool valve 30 in the axial direction Y.

Further, according to the present embodiment, the rotation stopper is the inner surface 24a of the groove 24. Therefore, it is not necessary to prepare a separate member as the rotation stopper, and the number of parts of the pressure control device 10 can be reduced. Thereby, it is possible to reduce the effort required for assembling the pressure control device 10 and the manufacturing cost of the pressure control device 10.

As described above, the oil that passes through the pressure control device 10 may contain foreign matter such as metal pieces, for example. It is preferable to capture such foreign matter as the oil passes through the pressure control device 10 and further prevent such foreign matter from flowing to the downstream side. Thus, the pressure control device 10 is configured to be able to capture foreign matter. Hereinafter, this configuration and the function thereof will be described with reference to FIG. 5 to FIG. 8.

Although the pressure control device 10 is applied to an oil pressure control device that controls the pressure of oil in the present embodiment, the disclosure is not limited thereto. In addition to the oil pressure control device, the device to which the pressure control device 10 can be applied may be a water pressure control device that controls the pressure of water, an air pressure control device that controls the pressure of air or the like, for example. In this case, there are fluids such as oil, water, and air that pass through the pressure control device 10, and these will be collectively referred to as "fluid Q" in the following description.

Figure 5:
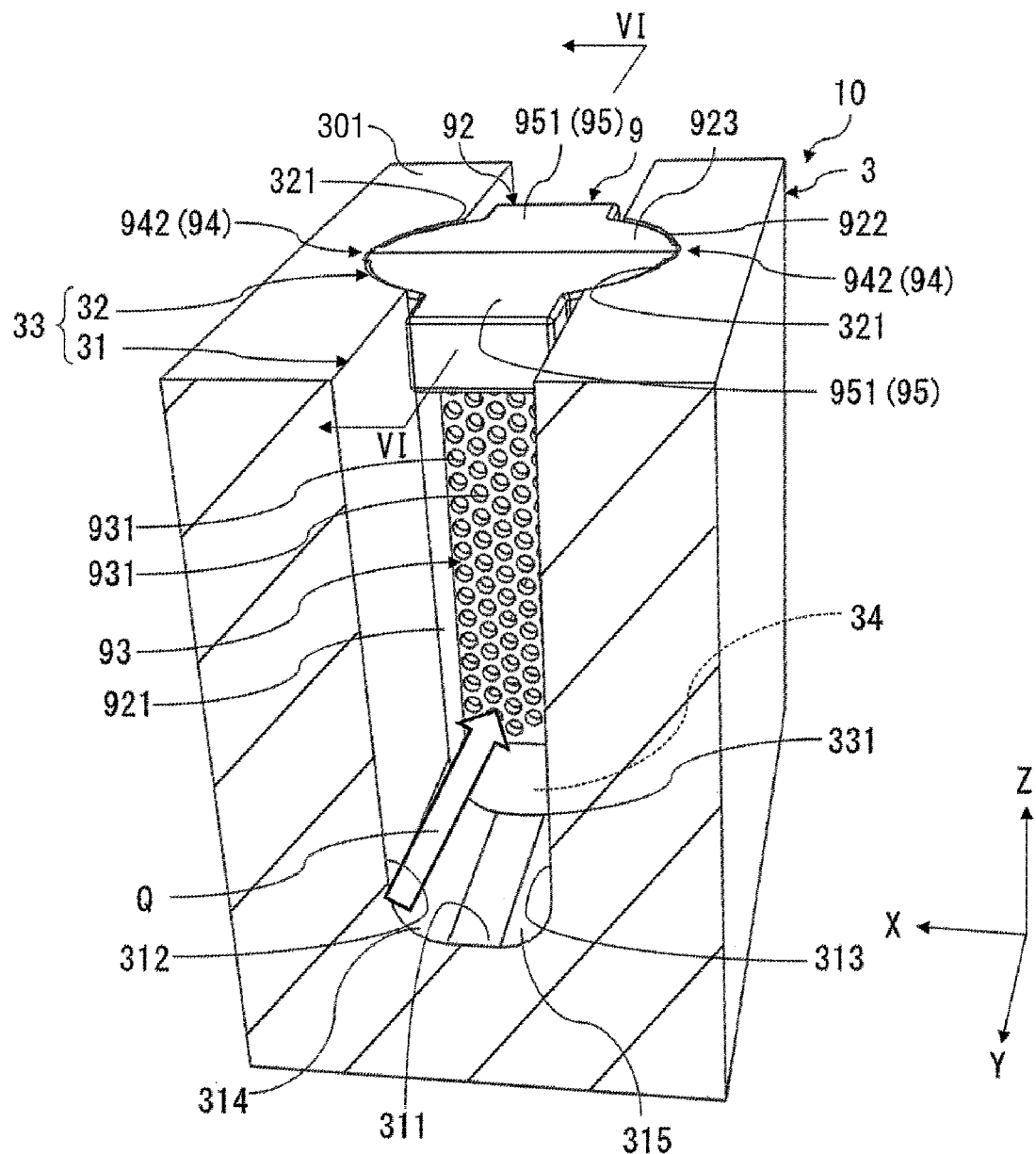
FIG. 5 is a longitudinal cross-sectional perspective view showing a part of the pressure control device shown in FIG. 1.

The pressure control device 10 further includes a filter unit 9 attached to a body 3, as shown in FIG. 5, in addition to the spool valve 30, the magnet holder 80, the magnet 50, the elastic member 70, the fixing member 71, the sensor module 40, etc. described above.

Figure 6:
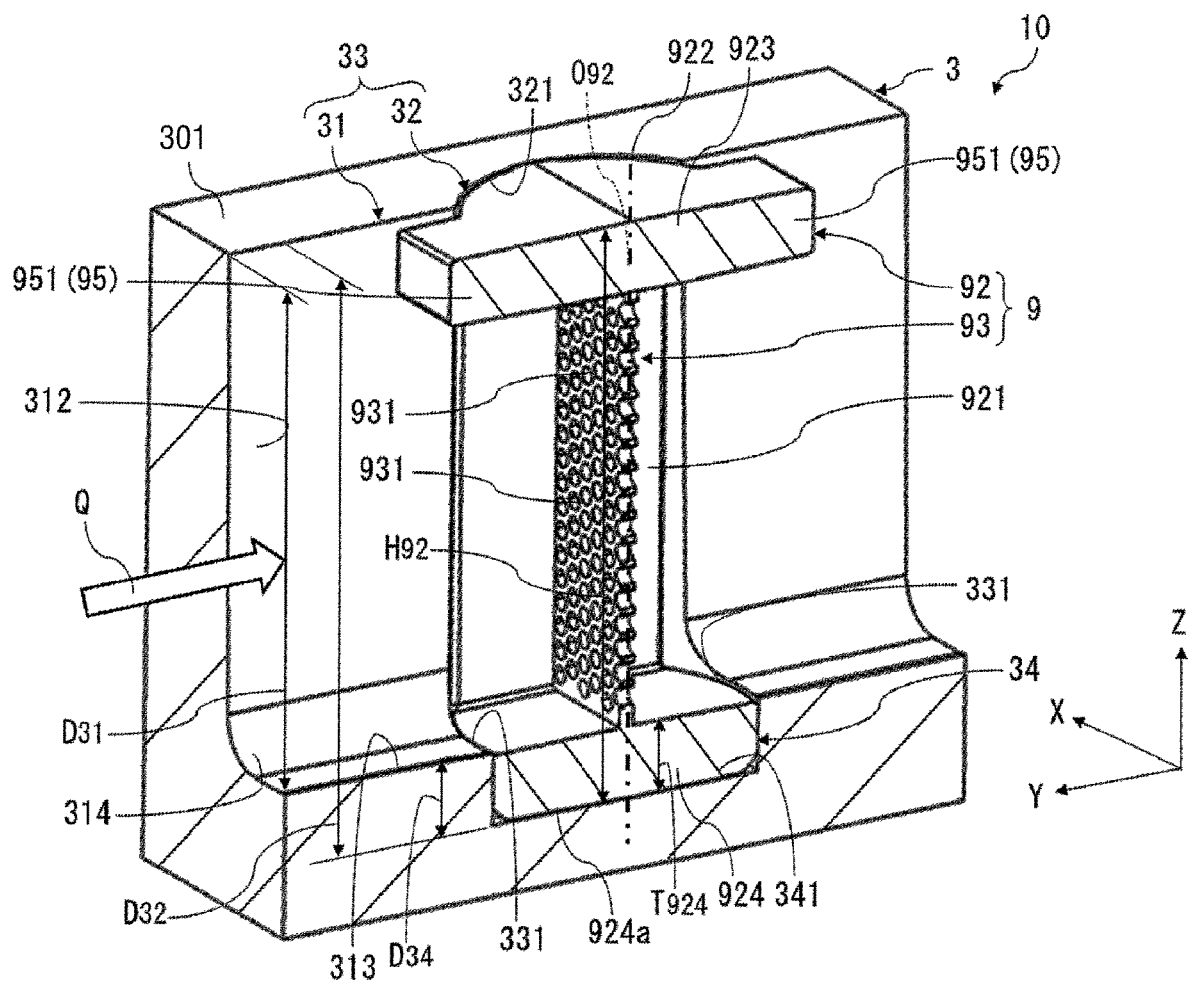
FIG. 6 is a cross-sectional view taken along the line VI-VI in FIG. 5.

The body 3 may be at least one of the lower body 21 and the upper body 22 that constitute the oil passage body 20. As shown in FIG. 5 and FIG. 6, the body 3 has a flow path 33 that is recessed on the upper surface (surface) 301 and allows the fluid Q to pass. The flow path 33 includes a groove 31 and a widened part 32 connected to the groove 31, and constitutes a part of the oil passage 10a.

The groove 31 has a bottom (first bottom) 311, a sidewall part 312 positioned on the left side of the bottom 311, and a sidewall part 313 positioned on the right side of the bottom 311. A boundary part 314 between the bottom 311 and the sidewall part 312 and a boundary part 315 between the bottom 311 and the sidewall part 313 are preferably rounded as shown in FIG. 5. Thereby, the fluid Q can pass smoothly near the boundary part 314 and the boundary part 315.

The groove 31 is a straight line along the axial direction Y in a plan view of the body 3 but not limited thereto, and at least a part of the groove 31 may have a curved portion. The width (first width) $W_{31}$ (see FIG. 7) of the groove 31, which is the distance between the sidewall part 312 and the sidewall part 313, is substantially constant along the axial direction Y. Further, the depth (first depth) $D_{31}$ of the groove 31, which is the depth from the surface 301 to the bottom 311, is also substantially constant along the axial direction Y.

The widened part 32 is provided in the middle of the groove 31 in the longitudinal direction, that is, the axial direction Y. The widened part 32 extends from the surface 301 to the bottom 311 and has a width larger than the width $W_{31}$ of the groove 31, and functions as a housing part for housing the cylindrical filter unit 9. The width $W_{32}$ (see FIG. 7) of the widened part 32 gradually increases from the upstream side toward the downstream side, that is, from the front side toward the rear side, and changes to gradually decrease from the middle toward the downstream side. In particular, in the present embodiment, the widened part 32 has a curved part 321 that is curved in an arc shape in the plan view.

The widened part 32 having such a shape can be machined using an end mill, for example.

As shown in FIG. 6, while the width $W_{32}$ of the widened part 32 is maintained constant along the vertical direction Z, the depth (second depth) $D_{32}$ from the surface 301 to the bottom surface (second bottom) 341 is larger than the depth $D_{31}$ of the groove 31. The widened part 32 has a receiving part 34 at the bottom, into which a lower portion of the filter unit 9 enters. Naturally, the depth $D_{34}$ of the receiving part 34 is equal to the difference between the depth $D_{32}$ and the depth $D_{31}$.

As shown in FIG. 5 and FIG. 6, the filter unit 9 is housed along the direction of the depth $D_{32}$ of the widened part 32 (that is, the vertical direction Z). When the fluid Q passes through the flow path 33, the filter unit 9 can capture foreign matter mixed in the fluid Q. Thereby, for example, malfunction of the operation of the pressure control device 10 caused by foreign matter can be prevented or suppressed. Such malfunction may be that the movement of the spool valve 30 in the spool hole 23 is hindered, for example.

The filter unit 9 includes a cylindrical frame 92 and a flat plate-shaped filter member 93 disposed on the inner side of the frame 92.

The filter member 93 is disposed along the central axis $O_{92}$ of the frame 92, and the thickness direction is parallel to the axial direction Y. Thereby, the filter member 93 can face the fluid Q that passes through the flow path 33.

The filter member 93 has a large number of small holes 931 that penetrate in the thickness direction of the filter member 93. These small holes 931 are spaced along both the left-right direction X and the vertical direction Z. In addition, the size of each small hole 931 is set so that the small hole 931 prevents foreign matter from passing through but does not block the flow of the fluid Q. The specific size of each small hole 931 is preferably 0.1 to 0.5 mm in diameter, and more preferably 0.3 to 0.4 mm in diameter. Moreover, the total area of the small holes 931 is preferably 10 to 20 mm$^2$, and more preferably 12 to 13 mm$^2$. Such small holes 931 improve the capability of the filter unit 9 for capturing foreign matter.

Further, the filter member 93 is in a state of being supported on the inner side of the frame 92. Thereby, the filter member 93 is prevented from being deformed by the flow of the fluid Q when the fluid Q passes through the filter member 93, so that the filter member 93 can reliably capture foreign matter. As a result, the capability of the filter unit 9 for capturing foreign matter is further improved.

Figure 7:
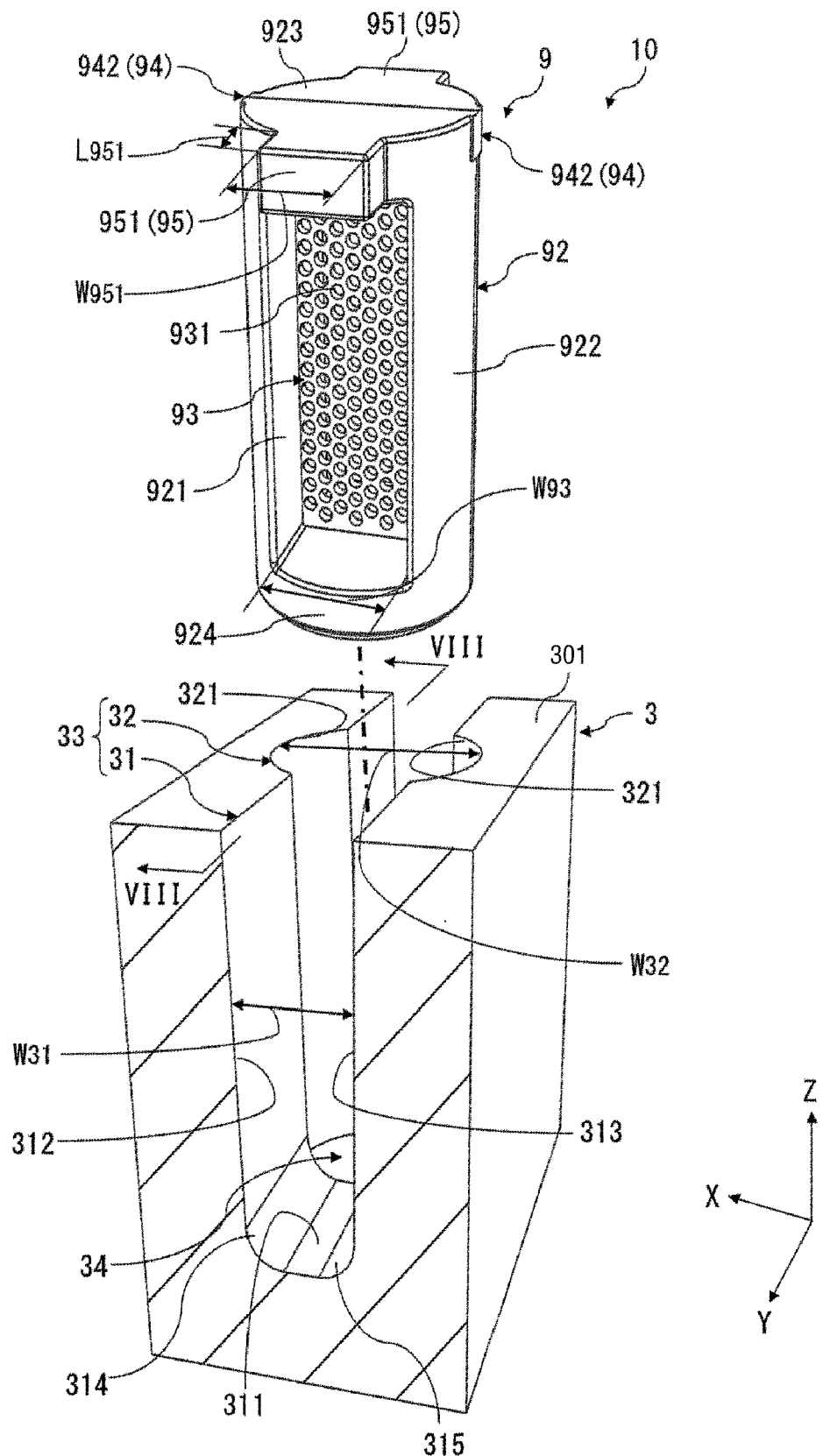
FIG. 7 is an exploded perspective view of the pressure control device shown in FIG. 5.

As shown in FIG. 7, the width $W_{93}$ of the filter member 93 is the same as the width $W_{31}$ of the groove 31 positioned on the upstream side of the widened part 32. Thereby, the capturing area of the filter member 93 for capturing foreign matter can be secured as wide as possible when the fluid Q passes through the filter member 93, so that the capability of the filter unit 9 for capturing foreign matter is further improved. Although the width $W_{93}$ is the same as the width $W_{31}$ in the present embodiment, the disclosure is not limited thereto, and the width $W_{93}$ may be larger than the width $W_{31}$, for example.

As shown in FIG. 6, the frame 92 has a cylindrical shape and includes a through hole part 921 that penetrates in parallel to the axial direction Y orthogonal to the central axis $O_{92}$. The outer shape of the frame 92 is cylindrical in the present embodiment, but the disclosure is not limited thereto, and the outer shape of the frame 92 may be rectangular cylindrical, for example. Then, the filter member 93 is disposed along the central axis $O_{92}$ of the frame 92 to block the through hole part 921.

Thereby, the filter member 93 and the frame 92 are unitized and configured as one part, that is, the filter unit 9.

When the body 3 and the filter unit 9 are assembled, the assembly can be performed by a simple operation of inserting the filter unit 9 into the widened part 32. Also, as described above, the widened part 32 is wider than the groove 31. Thereby, the filter unit 9 can be easily inserted into the widened part 32 regardless of the width $W_{31}$ of the groove 31, so that the workability of assembling the body 3 and the filter unit 9 is improved.

As shown in FIG. 7, since the frame 92 has a cylindrical shape as described above, an outer circumferential part 922 of the frame 92 is rounded in an arc shape. On the other hand, in the widened part 32 in which the filter unit 9 is housed, the curved shape of the curved part 321 is curved along the rounded arc shape of the outer circumferential part 922 of the frame 92. Thereby, when the body 3 and the filter unit 9 are assembled, the filter unit 9 can be easily inserted into the widened part 32.

As shown in FIG. 5 and FIG. 6, the frame 92 (filter unit 9) has a height $H_{92}$ that does not protrude toward the upper side from the flow path 33 when housed in the widened part 32. The height $H_{92}$ is the same as the depth $D_{32}$. Thereby, when another member is placed and assembled on the upper side of the body 3 and the filter unit 9 in the assembled state, as the frame 92 does not protrude from the flow path 33, the assembly of the another member is facilitated.

In addition, the cylindrical frame 92 includes a blocking wall part 923 that blocks the upper side in the direction of the central axis $O_{92}$, and a blocking wall part 924 that blocks the lower side. In the state where the filter unit 9 is housed in the widened part 32, the lower portion (a part) of the filter unit 9, that is, the blocking wall part 924 of the blocking wall part 923 and the blocking wall part 924, can enter the receiving part 34.

For such a configuration, for example, if the receiving part 34 is omitted from the widened part 32, the bottom of the widened part 32 and the bottom 311 of the groove 31 are at the same height and become continuous. Then, when the filter unit 9 is housed in the widened part 32, a slight gap may be generated between the bottom of the widened part 32 and an end surface 924a of the blocking wall part 924. The fluid Q may flow through the gap, and in such a case, foreign matter may not be captured by the filter unit 9 and may flow beyond the filter unit 9 to the downstream side.

As described above, the pressure control device 10 is configured so that the blocking wall part 924 of the filter unit 9 enters the receiving part 34 of the widened part 32. In other words, in the pressure control device 10, a step 331 is formed (at a boundary) between the bottom 311 of the groove 31 and the bottom surface 341 of the receiving part 34, and the blocking wall part 924 is disposed to eliminate the step 331. Thereby, it is substantially difficult for the fluid Q to flow and bypass between the blocking wall part 924 and the receiving part 34. Therefore, foreign matter can be prevented from flowing beyond the filter unit 9 to the downstream side. In addition, even if a gap is generated between the blocking wall part 924 and the receiving part 34, the size of the gap can be suppressed to 0.4 mm or less.

The thickness $T_{924}$ of the blocking wall part 924 is the same as the depth $D_{34}$ of the receiving part 34. For example, if the thickness $T_{924}$ and the depth $D_{34}$ are different, a step may be formed between the bottom 311 of the groove 31 and the blocking wall part 924, and depending on the size of the step, the fluid Q may be hindered from smoothly passing through the filter unit 9. In the pressure control device 10, the thickness $T_{924}$ and the depth $D_{34}$ are the same, by which the step can be eliminated, and therefore, the fluid Q can pass through the filter unit 9 smoothly. In addition, since the fluid Q can pass smoothly, it becomes more difficult for the fluid Q to flow and bypass between the blocking wall part 924 and the receiving part 34. Thereby, it is possible to more reliably prevent foreign matter from flowing beyond the filter unit 9 to the downstream side.

Figure 8:
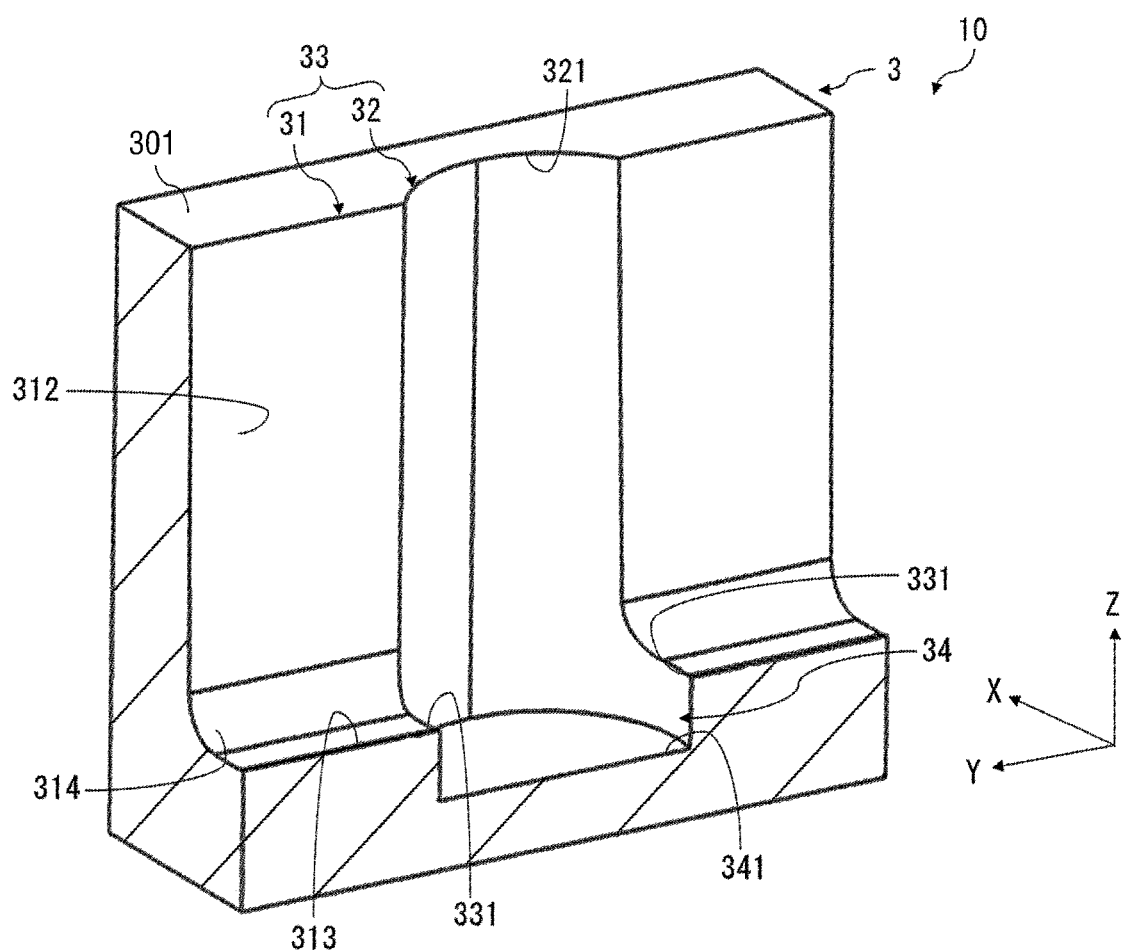
FIG. 8 is a cross-sectional view taken along the line VIII-VIII in FIG. 7.

As shown in FIG. 8, the receiving part 34 has the flat bottom surface 341. Then, as shown in FIG. 6, when the filter unit 9 is housed in the widened part 32, the entire end surface 924a of the blocking wall part 924 of the filter unit 9 can be in contact with the bottom surface 341. Thereby, the posture of the filter unit 9 in the widened part 32 is stabilized even when the fluid Q is passing through the flow path 33, and thus foreign matter can be stably captured.

As shown in FIG. 5 and FIG. 6, the filter unit 9 includes a regulation part 95 that regulates the arrangement direction of the filter unit 9 with respect to the groove 31 when the filter unit 9 is housed in the widened part 32 to stop the filter unit 9 from rotating around the central axis $O_{92}$. The regulation part 95 is constituted by a pair of protrusions 951 protruding in a block shape or a plate shape on the blocking wall part 923 of the frame 92. One of the protrusions 951 protrudes toward the groove 31 positioned on the upstream side of the widened part 32, that is, the front side in the axial direction Y, and the other protrusion 951 protrudes toward the groove 31 positioned on the downstream side of the widened part 32, that is, the rear side in the axial direction Y.

Nevertheless, the regulation part 95 may not have a pair of protrusions 951. For example, one of the protrusions 951 may be omitted.

Furthermore, the width $W_{951}$ of each protrusion 951 is preferably slightly smaller than the width $W_{31}$ of the groove 31.

Then, when the filter unit 9 is housed in the widened part 32, the protrusions 951 are disposed in the groove 31. At this time, each protrusion 951 may come into contact with at least one of the sidewall part 312 and the sidewall part 313 of the groove 31. With such protrusions 951, when the filter unit 9 is housed in the widened part 32, the arrangement direction of the filter unit 9 with respect to the groove 31 is correctly regulated, and thus the filter unit 9 is prevented from rotating around the central axis $O_{92}$. Thereby, the filter member 93 can face the direction of the flow of the fluid Q regardless of the strength of the flow of the fluid Q, so that foreign matter can be stably captured.

In addition, the regulation part 95 can be constituted by the protrusions 951 that have a simple shape, which contributes to the high efficiency in manufacturing the filter unit 9.

Moreover, by providing the regulation part 95 on the blocking wall part 923 of the frame 92, the regulation part 95 can be disposed as close to the corner of the flow path 33 as possible, so that the regulation part 95 can be prevented or suppressed from hindering the flow of the fluid Q.

As shown in FIG. 5, the filter unit 9 includes a detachment prevention part 94 that prevents the filter unit 9 from being detached from the widened part 32 after the filter unit 9 is inserted into the widened part 32. The detachment prevention part 94 is constituted by a pair of flat protrusions 942 protruding on the blocking wall part 923 of the frame 92 and having a flat shape. As shown in FIG. 7, one of the flat protrusions 942 protrudes toward the left side in the left-right direction X and the other flat protrusion 942 protrudes toward the right side in the left-right direction X. Then, when the filter unit 9 is housed in the widened part 32, each flat protrusion 942 is pressed against the widened part 32 in the protruding direction of the flat protrusion 942. Thereby, the filter unit 9 can be prevented from being detached from the widened part 32. Hereinafter, the effect brought by the detachment prevention part 94 may be referred to as the "detachment prevention effect". With the detachment prevention effect, for example, even if the body 3 and the filter unit 9 in the assembled state are turned upside down or shaken during transportation, it is possible to prevent the filter unit 9 from being detached from the widened part 32, and prevent the body 3 and the filter unit 9 from falling apart unintentionally.

Regarding the filter unit 9 configured as described above, for example, the frame 92 is preferably made of resin and the filter member 93 is preferably made of metal. Thereby, the filter unit 9 can be an insert molded product of the frame 92 and the filter member 93. Thereby, high efficiency can be achieved when manufacturing the filter unit 9. In particular, the cylindrical shape of the frame 92 facilitates the formation of the filter unit 9.

Second Embodiment

Hereinafter, the second embodiment of the pressure control device of the disclosure will be described with reference to FIG. 9 to FIG. 11, but the description will focus on the difference between the second embodiment and the above-described embodiment, and the same matters will be omitted. The present embodiment is the same as the first embodiment except that the detachment prevention part has a different configuration.

Figure 9:
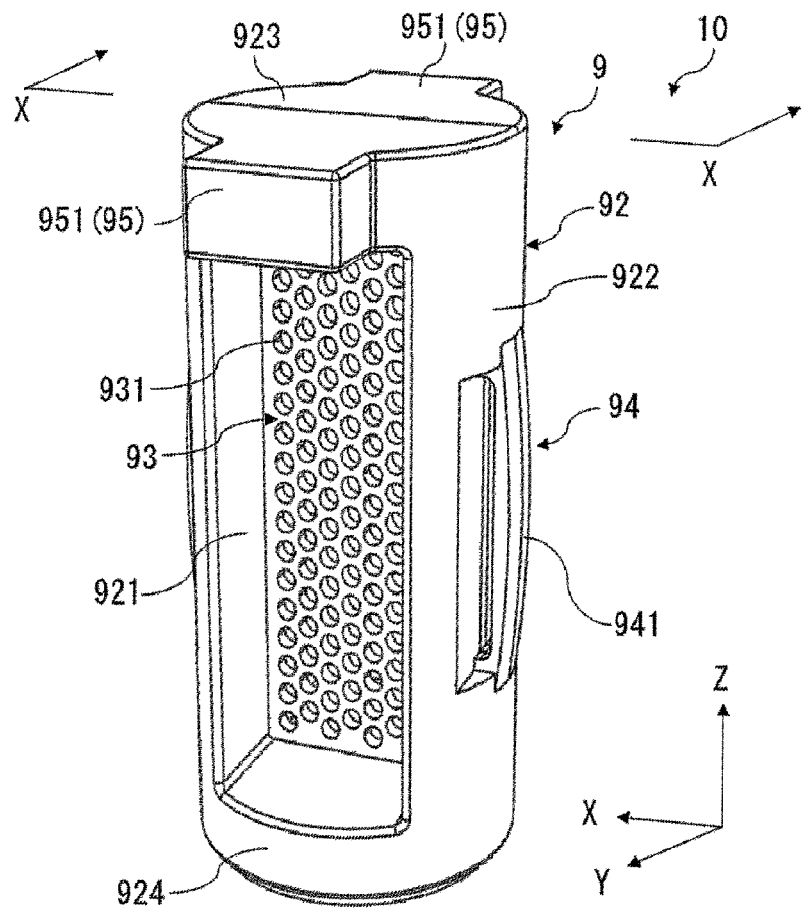
FIG. 9 is a perspective view showing the filter unit provided in the pressure control device (second embodiment) of the disclosure.
Figure 10:
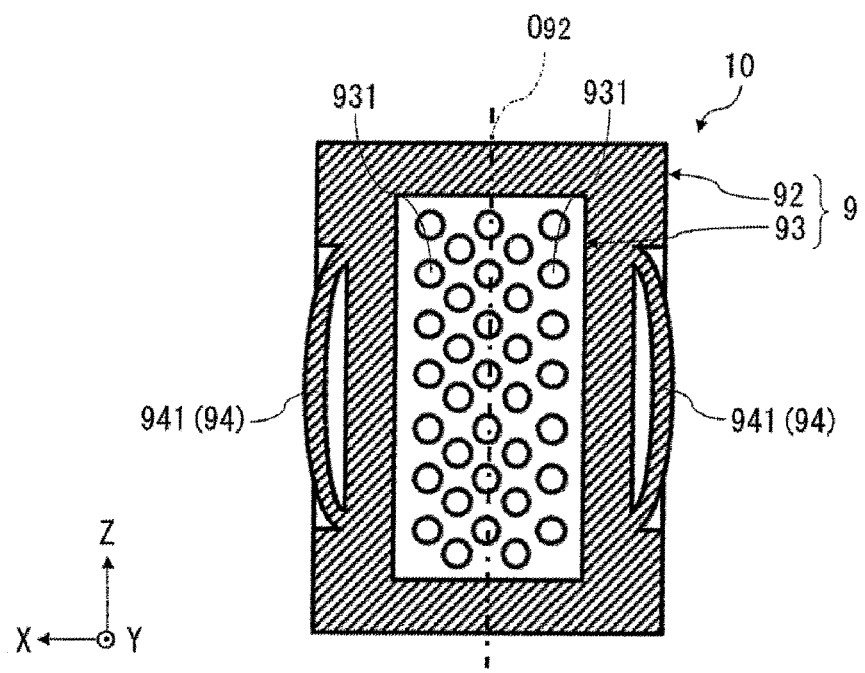
FIG. 10 is a cross-sectional view taken along the line X-X in FIG. 9.
Figure 11:
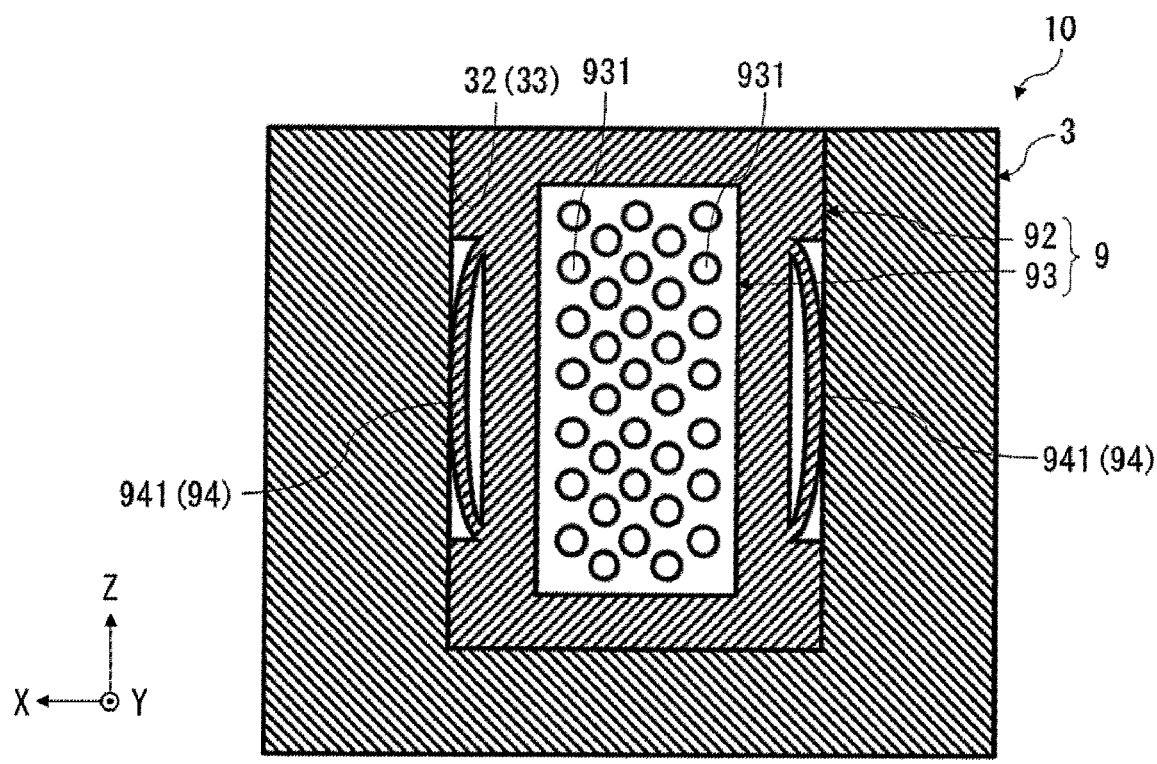

As shown in FIG. 9 and FIG. 10, in the present embodiment, the detachment prevention part 94 includes a pair of elastic pieces 941 that are provided on the outer circumferential part 922 of the frame 92 and elastically deform. As shown in FIG. 11, each elastic piece 941 can be pressed against the widened part 32 and elastically deformed when the filter unit 9 is housed in the widened part 32. Thereby, it is possible to prevent the filter unit 9 from being detached from the widened part 32 to prevent the body 3 and the filter unit 9 from falling apart unintentionally.

Each elastic piece 941 is disposed in parallel to the vertical direction Z and supported at both ends. In addition, each elastic piece 941 has an arched shape in a natural state where no external force is applied, that is, a state where the filter unit 9 is not housed in the widened part 32 yet. Thereby, each elastic piece 941 is easy to be deformed when an external force is applied. Moreover, each elastic piece 941 can be in close contact with the widened part 32 after being deformed so as to prevent the filter unit 9 from being detached from the flow path 33.

In addition, each elastic piece 941 is disposed in parallel to the vertical direction Z on the outer circumferential part 922 of the frame 92 and has an arched shape. Thereby, when the operation of inserting the filter unit 9 toward the lower side in the vertical direction Z into the widened part 32 is performed, it is possible to prevent the elastic piece 941 from hindering the operation.

As shown in FIG. 10, a pair of elastic pieces 941 are disposed opposite to each other via the central axis $O_{92}$ of the frame 92, and one elastic piece 941 is positioned on the left side in the left-right direction X and the other elastic piece 941 is positioned on the right side in the left-right direction X. Thereby, the detachment prevention effect of the detachment prevention part 94 is stably exhibited.

Third Embodiment

Hereinafter, the third embodiment of the pressure control device of the disclosure will be described with reference to FIG. 12, but the description will focus on the difference between the third embodiment and the above-described embodiment, and the same matters will be omitted.

The present embodiment is the same as the first embodiment except that the regulation part has a different configuration.

Figure 12:
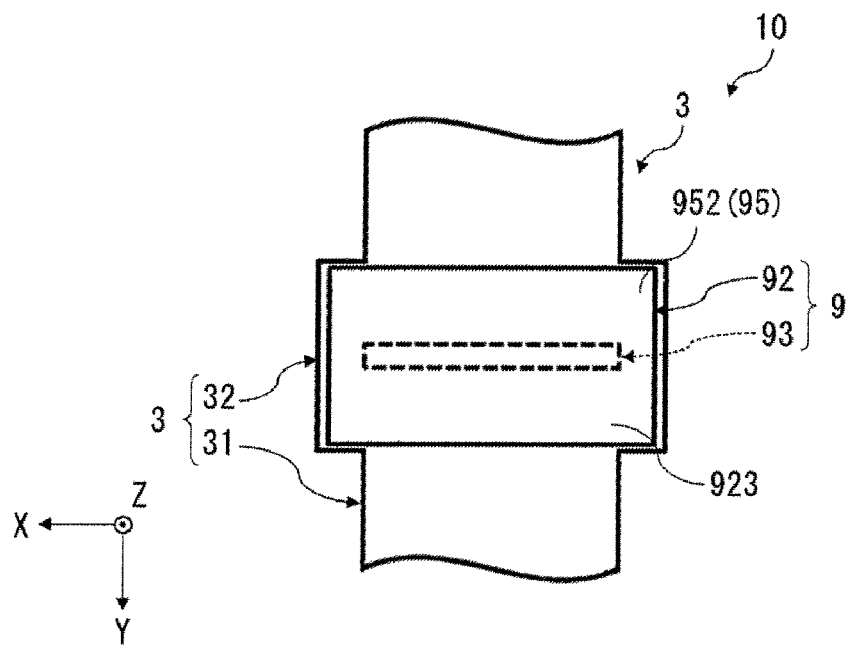
FIG. 12 is a plan view showing a part of the pressure control device (third embodiment) of the disclosure.

As shown in FIG. 12, in the present embodiment, the regulation part 95 is constituted by a non-circular part 952 having a non-circular shape that the blocking wall part 923 of the frame 92 is rectangular in the plan view. The long side direction of the non-circular part 952 is parallel to the left-right direction X and the short side direction is parallel to the axial direction Y. The blocking wall part 924 of the frame 92 preferably has the same shape as the blocking wall part 923.

Such a non-circular part 952 prevents the filter unit 9 from rotating around the central axis $O_{92}$ when the filter unit 9 is housed in the widened part 32, so that foreign matter can be stably and reliably captured by the filter member 93.

Also, the regulation part 95 can be constituted by the non-circular part 952 that has a simple shape, which contributes to the high efficiency in manufacturing the filter unit 9.

Fourth Embodiment

Hereinafter, the fourth embodiment of the pressure control device of the disclosure will be described with reference to FIG. 13, but the description will focus on the difference between the fourth embodiment and the above-described embodiment, and the same matters will be omitted.

The present embodiment is the same as the first embodiment except that the regulation part has a different shape.

Figure 13:
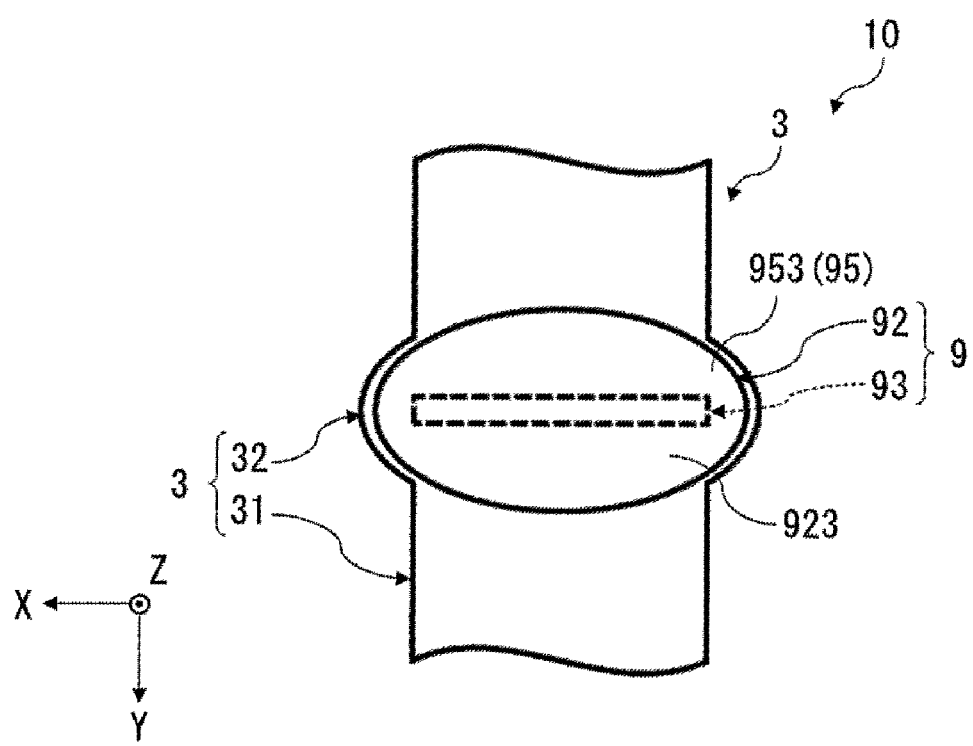
FIG. 13 is a plan view showing a part of the pressure control device (fourth embodiment) of the disclosure.

As shown in FIG. 13, in the present embodiment, the regulation part 95 is constituted by a non-circular part 953 having a non-circular shape that the blocking wall part 923 of the frame 92 is elliptical in the plan view. The long diameter direction of the non-circular part 953 is parallel to the left-right direction X and the short diameter direction is parallel to the axial direction Y. The blocking wall part 924 of the frame 92 preferably has the same shape as the blocking wall part 923.

Such a non-circular part 953 prevents the filter unit 9 from rotating around the central axis $O_{92}$ when the filter unit 9 is housed in the widened part 32, so that foreign matter can be stably and reliably captured by the filter member 93.

Also, the regulation part 95 can be constituted by the non-circular part 953 that has a simple shape, which contributes to the high efficiency in manufacturing the filter unit 9.

In addition, the non-circular part 953 has a rounded shape in the plan view. In comparison with the non-circular part 952 that has a rectangular shape, for example, the non-circular part 953 helps to easily and quickly perform the operation of inserting the filter unit 9 into the widened part 32.

Although the pressure control device of the disclosure has been described above with reference to the illustrated embodiments, the disclosure is not limited thereto, and each part of the pressure control device can be replaced with a part of any configuration that can perform the same function. Besides, any component may be added.

Further, the pressure control device of the disclosure may be a combination of any two or more configurations (features) of the above embodiments.

In addition, although the filter member is disposed along the central axis of the frame in each of the above embodiments, the disclosure is not limited thereto. For example, the filter member may be curved in an arched shaped to be disposed, or may be bent in a doglegged shape to be disposed. The flat plate-shaped filter member may also be disposed obliquely with respect to the central axis of the frame.

What is claimed is:

1. A pressure control device, comprising:
    a body having a flow path that comprises a groove and a widened part, wherein a depth of the groove from a surface to a first bottom is a first depth, and the widened part is connected to the groove, extends from the surface to the first bottom, and has a width larger than a width of the groove, and
    the body further includes a lower body and an upper body, wherein the lower body includes a lower body main body and a separate plate disposed to overlap on an upper side of the lower body main body, the upper body is disposed to overlap the lower body with the separate plate in between, and an oil passage is provided in both the lower body and the upper body; and
    a cylindrical filter unit housed along a depth direction of the widened part to capture foreign matter mixed in a fluid that passes through the flow path,
    wherein a depth of the widened part from the surface to a second bottom is a second depth larger than the first depth, and the widened part comprises a receiving part that a part of the filter unit enters, and
    wherein the filter unit comprises a cylindrical frame and a flat plate-shaped filter member, wherein the frame comprises a through hole part that penetrates in a direction orthogonal to a central axis of the frame, and the filter member blocks the through hole part and is disposed along the central axis of the frame, and
    wherein the filter unit comprises a regulation part that regulates an arrangement direction with respect to the groove.

2. The pressure control device according to claim 1, further comprising a step at a boundary between the receiving part and the groove.

3. The pressure control device according to claim 1, wherein the receiving part has a flat bottom surface, with which an end surface on one side of the filter unit is in contact when the filter unit is housed in the widened part.

4. The pressure control device according to claim 1, wherein the frame comprises blocking wall parts that respectively block both sides of the frame in a central axis direction thereof, and
    one of the blocking wall parts enters the receiving part when the filter unit is housed in the widened part.

5. The pressure control device according to claim 4, wherein a thickness of the one of the blocking wall parts is the same as a depth of the receiving part.

6. The pressure control device according to claim 1, wherein the regulation part comprises a protrusion that protrudes toward the groove positioned on an upstream side or a downstream side of the widened part.

7. The pressure control device according to claim 1, wherein the regulation part is constituted by a non-circular portion.

* * * * *